(12) United States Patent
Quiquempois et al.

(10) Patent No.: US 8,442,372 B2
(45) Date of Patent: May 14, 2013

(54) HYBRID MICROSTRUCTURED OPTICAL FIBRE FOR GUIDANCE BY MEANS OF PHOTONIC FORBIDDEN BANDS AND BY TOTAL INTERNAL REFLECTION OPTIMISED FOR NON-LINEAR APPLICATIONS

(75) Inventors: Yves Quiquempois, Marquette lez lille (FR); Geraud Bouwmans, Lille (FR); Mathias Perrin, La Brede (FR); Aurelie Betourne, Lille (FR); Marc Douay, Lille (FR); Karen Delplace, Estaires (FR); Antoine Le Rouge, Lille (FR); Laurent Bigot, Hellemmes-Lille (FR)

(73) Assignee: Universite des Sciences et Technologies de Lille, Villeneuve d'Aseq Cedex (FR)

( * ) Notice: Subject to any disclaimer, the term of this patent is extended or adjusted under 35 U.S.C. 154(b) by 558 days.

(21) Appl. No.: 12/670,500

(22) PCT Filed: Jul. 25, 2008

(86) PCT No.: PCT/FR2008/001111
§ 371 (c)(1),
(2), (4) Date: Jan. 25, 2010

(87) PCT Pub. No.: WO2009/047404
PCT Pub. Date: Apr. 16, 2009

(65) Prior Publication Data
US 2010/0226614 A1    Sep. 9, 2010

(30) Foreign Application Priority Data

Jul. 26, 2007 (EP) .................................. 07370013

(51) Int. Cl.
*G02B 6/02* (2006.01)
*G02B 6/00* (2006.01)
*G02F 1/383* (2006.01)

(52) U.S. Cl.
USPC ........... 385/122; 385/123; 385/125; 385/126; 385/144

(58) Field of Classification Search .................. 385/122, 385/123, 125, 126, 144
See application file for complete search history.

(56) References Cited

PUBLICATIONS

Cerqueira, A. S. Jr et al.: "Hybrid photonic crystal fiber", Optics Express Opt. Soc. America USA, vol. 14, No. 2, Jan. 2006, XP002464107, ISSN: 1094-4087, pp. 926-931.
Betourne, A. et al.: "Solid photonic bandgap fiber assisted by an extra air-clad structure for low-loss operation around 1.5 [mu]m", Optics Express Opt. Soc. America USA, vol. 15, No. 2, Jan. 2007, XP002464106, ISSN: 1094-4087, pp. 316-324.

(Continued)

*Primary Examiner* — Uyen Chau N Le
*Assistant Examiner* — Michael Mooney
(74) *Attorney, Agent, or Firm* — Harness, Dickey & Pierce, P.L.C.

(57) ABSTRACT

The microstructured optical fibre comprises a core (4) surrounded by a sheath (1) comprising a base material having a refraction index (ni) and a plurality of at least two different types of inclusion: a first type of inclusion (2) having a refraction index n2 (n2>n1), and a second type of inclusion (3) having a refraction index n3 (n3<n1). The inclusions (2, 3) are arranged and dimensioned in such a way as to ensure guidance, by total internal reflection (RTI), of a fundamental mode of the light, centred on a wavelength $\lambda_{RTI}$, and of a fundamental mode of the light in the first photonic forbidden band (BG1), centred on a wavelength $\lambda_{BG1}$, which is different to that $\lambda_{RTI}$ of the fundamental mode guided by total internal reflection (RTI).

29 Claims, 21 Drawing Sheets

PUBLICATIONS

Mortensen, N. A. et al.: "Photonic crystal fiber with a hybrid honeycomb cladding", Optics Express Opt. Soc. America USA, vol. 12, No. 3, Feb. 9, 2004, XP002464105, ISSN: 1094-4087, pp. 468-472.

Efimov, A. et al.: "Phase-matched third harmonic generation microstructured fibers", Optics Express Opt. Soc. America USA, vol. 11, No. 20, Oct. 6, 2003, XP002464108, ISSN: 1094-4087, pp. 2567-2576.

Laegsgaard, J. et al,: "Doped photonic bandgap fibers for short-wavelength nonlinear devices", Optics Letters, OSA, Optical Society of America, Washington, DC, US, vol. 28, No. 10, May 15, 2003, XP002328354, ISSN: 0146-9592, pp. 783-785.

Perrin, Mathias et al.: "Coexistence of total internal reflexion and bandgap modes in solid core photonic bandgap fibre with intersticial air holes", Optics Express, Optical Society of America, Washington, DC, US, vol. 15, No. 21, Oct. 15, 2007, XP007907699, ISSN: 1094-4087, pp. 13783-13795.

HYBRID MICROSTRUCTURED OPTICAL FIBRE FOR GUIDANCE BY MEANS OF PHOTONIC FORBIDDEN BANDS AND BY TOTAL INTERNAL REFLECTION OPTIMISED FOR NON-LINEAR APPLICATIONS

CROSS-REFERENCE TO RELATED APPLICATIONS

This application is a U.S. National Stage (371) of International Application No. PCT/FR2008/001111 filed Jul. 25, 2008, and published in French as WO 2009/047404 A1 on Apr. 16, 2009, which claims the benefit of EP Application No. 07 370 013.0, filed Jul. 26, 2007. The disclosures of the above applications are incorporated herein by reference.

FIELD OF THE INVENTION

The present invention relates to a hybrid microstructured optical fibre for guidance of light by both a mechanism of photonic forbidden bands and a mechanism of total internal reflection. This hybrid microstructured optical fibre features a new cross section, which makes it particularly suitable for non-linear applications, such as for instance, but not exclusively, the doubling of frequency (w+w→2w), the tripling of frequency (w+w+w→3w), the generation of twin photons (2w→w+w), the generation of triplet photons (w3→w+w+w), etc. This optical fibre can advantageously be used in numerous technical fields, such as for instance "all fibre" high-powered lasers, the securitisation of telecommunication networks through quantum cryptography, the generation of new frequencies through non-linear effects in various technical fields, and for instance in the field of telecommunications or the biomedical field.

PRIOR ART

Recent research into the field of optical fibres has led to the development of a new type of so-called microstructured fibres, which are also called photonic crystal fibres (PCF), or photonic bandgap (forbidden band) fibres (or PBGF).

In general, these microstructured fibres include a core surrounded by a cladding, which is realised in a background material, most often in silica, and which comprises a transverse network of longitudinal inclusions featuring refractive indices that are different from the refractive index of the background material of the cladding.

The refractive index of the background material of the optical fibre (silica, for instance) varies in function of the wavelength (dispersion). In contrast to step-index optical fibres, microstructured fibres advantageously enable this dispersion to be significantly modified, thanks to the presence of said inclusions of different refractive indices.

A first implemented type of inclusions is constituted by inclusions featuring a refractive index that is higher than the refractive index of the background material.

For instance, but not exclusively, if the background material is silica, a first type of higher refractive index inclusions can be constituted by silican inclusions doped with germanium oxide ($GeO_2$).

A second implemented type of inclusions is constituted by inclusions featuring a refractive index that is lower than the refractive index of the background material.

For instance, but not exclusively, if the background material is silica, a second type of lower refractive index inclusions can be constituted by cavities or holes filled with a fluid (gas or liquid), most often filled with air.

In some cases, the cladding can include only higher refractive index inclusions, or only lower refractive index inclusions, or a combination of the two types of inclusions.

In some cases, the inclusions can be arranged in the form of a periodic network or be randomly distributed, or distributed according to a configuration including both periodic regions and non-periodic regions.

In function of their cross-sectional structure, the microstructured optical fibres enable light to be propagated along the longitudinal axis of the fibre, guided by total internal reflection or guided by photonic forbidden bands.

In 2003, Jesper Laegsgaard and Anders Bjarklev described in the publication entitled "Doped photonic bandgap fibres for short-wavelength non linear devices", Vol. 28, No. 10, p. 783 (2003), OPTICS LETTERS, a microstructured optical fibre including germanium oxide-doped silica pads and air holes, featuring zero dispersion in the visible range. The microstructured optical fibre described in this publication enables light to be guided only by photonic forbidden bands and does not enable light to be guided by total internal reflection, as a result of the presence of six central air holes.

In 2006, Arismar Cerqueira et al described in the publication entitled "Hybrid photonic crystal fiber", Vol. 14, No. 2, p. 926 (2006), OPTICS EXPRESS, a microstructured optical fibre that comprises air holes and germanium-doped silica pads inserted in a background material of non-doped silica, of which the cross-sectional structure enables the light to be guided both by a photonic forbidden bands mechanism in a first direction, and by total internal reflection in a second direction, perpendicular to said first direction. In this fibre structure, and for a same wavelength, the mode is guided by both photonic forbidden bands and by total reflection.

The microstructured fibres described in the above-mentioned publications cannot be used for non-linear applications, such as for instance the doubling of frequency (w+w→2w), the tripling of frequency (w+w+w→3w), the generation of twin photons (2w→w+w), the generation of triplet photons (w3→w+w+w), etc. To date, in these non-linear optical applications, non-linear crystals are used. However, these non-linear crystals present several drawbacks. In such crystals, the optical wave is not guided, so that the non-linear interaction lengths measure a few centimetres as opposed to a few metres for the optical fibres. In addition, the insertion of massive components implementing these non-linear crystals inevitably leads to losses and alignment problems, and thus to fragile and costly devices.

A further study published by A. Efimov, A. J. Taylor, F. G. Omenetto, J. C.

Knight, W. J. Wadsworth and P. St. J. Russel in the publication entitled "Phase matched third harmonics generation in microstructured fibers", 6 Oct. 2003, Vol. 11, No. 20, p. 2567—OPTICS EXPRESS, describes a solution for obtaining a tripling of frequency with a phase index match. The solution consists in carrying out a phase match between the fundamental mode, which propagates itself by total internal reflection in the microstructured optical fibre, and the higher-order transverse modes, in particular third-harmonic modes. Nevertheless, the results obtained in this study are not really satisfactory, since the cross-sectional structure of the third-harmonic mode features multiple lobes, which is detrimental to the performance and use of this solution.

OBJECTS OF THE INVENTION

One of the objects of the invention is to suggest a new microstructured optical fibre, which can advantageously be used to replace non-linear crystals in non-linear optical applications such as for instance the generation of twin photons (2w→w+w with w=2πC/λ, c being the speed of light in vacuum, or more generally $w_1 \rightarrow w_2+w_3$), the generation of triplet photons (3w→w+w+w or more generally $w_1 \rightarrow w_2+w_3+w_4$), or applications such as the generation of frequencies through a non-linear effect, and in particular the combining of 3 wavelengths ($w_1+w_2 \rightarrow w_3$) or more particularly the doubling of frequency (w+w→2w), the combining of 4 wavelengths ($w_1+w_2+w_3 \rightarrow w_4, w_1+w_2 \rightarrow w_3+w_4$) or more particularly the tripling of frequency (w+w+w→3w).

SUMMARY OF THE INVENTION

This object is achieved by the microstructured optical fibre defined in claim 1.

This microstructured optical fibre of the invention features the following technical characteristics, known and described in the above-mentioned publication entitled "Doped photonic bandgap fibers for short-wavelength non linear devices", Vol. 28, No. 10, p. 783 (2003), OPTICS LETTERS, by Jesper Laegsgaard and Anders Bjarklev. It includes a core surrounded by a cladding, the cladding comprising a background material having a refractive index (n1) and a plurality of at least two different types of inclusions, a first type of inclusion having a refractive index (n2) that is higher than the refractive index (n1) of the cladding material, and a second type of inclusion having a refractive index (n3) that is lower than the refractive index (n1) of the background material, said fibre enabling guidance by photonic forbidden bands of a fundamental mode of the light.

In a characteristic manner according to the invention, the cladding inclusions are arranged and dimensioned in such a way as to ensure guidance by total internal reflection (RTI) of a fundamental mode of the light, centred on a wavelength $\lambda_{RTI}$, and guidance of a fundamental mode of the light in the first photonic forbidden band (BG1), centred on a wavelength $\lambda_{BG1}$, which is lower than that $\lambda_{RTI}$ of the fundamental mode guided by total internal reflection (RTI).

The microstructured optical fibre of the invention can also include other additional and optional technical characteristics mentioned in the annexed claims.

BRIEF DESCRIPTION OF THE DRAWINGS

The characteristic features and advantages of the invention will appear more clearly and completely upon reading the detailed description hereinafter of a preferred embodiment of a microstructured optical fibre of the invention, said detailed description being given by way of a non-limiting and non-exhaustive example of the invention and with reference to the annexed figures, in which.

DETAILED DESCRIPTION

Figure 1:
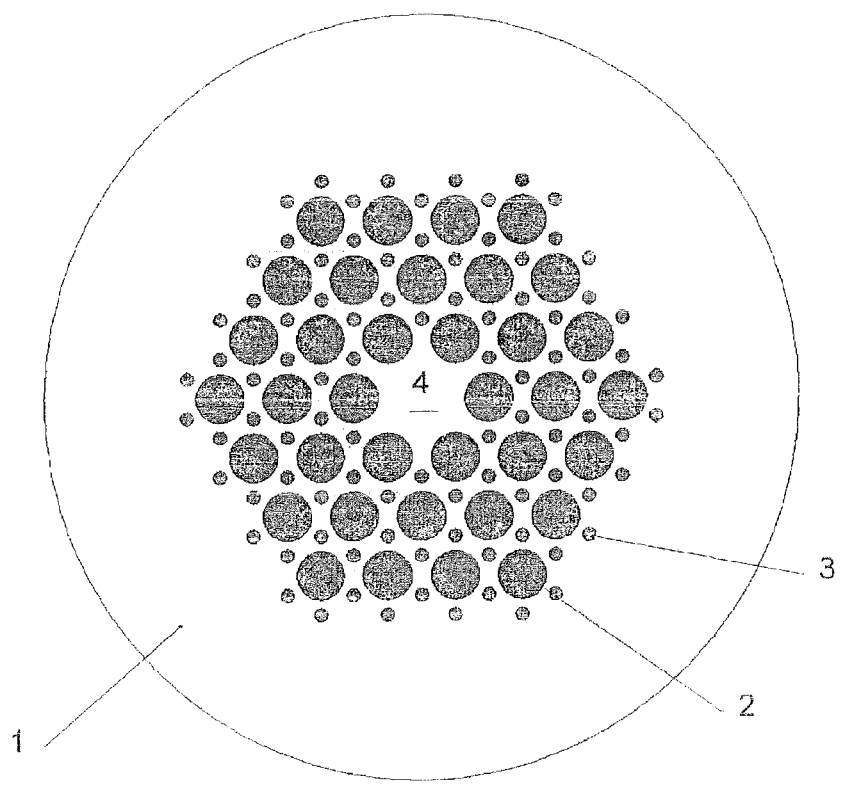
FIG. 1 is a cross-sectional view of a microstructured optical fibre according to a first embodiment of the invention.

With reference to FIG. 1, a preferred embodiment of the hybrid microstructured optical fibre of the invention includes a cladding 1 that is made of a background material of a refractive index (n1), in which is arranged a periodic network of inclusions 2, 3, which extend along the entire length of the fibre. At the centre of the fibre, this network of inclusions 2, 3 features a central defect 4 (absence of inclusions), forming the core of the optical fibre.

In a general manner, the inclusions 2 are characterised by a refractive index n2 that is higher than the refractive index n1 of the cladding material. The inclusions 3 are characterised by a refractive index n3 that is lower than the refractive index n1 of the background material of the cladding 1.

In the embodiments illustrated in the drawings, the core 4 of the fibre is made of the same material as the background material of the cladding 1, and thus presents a refractive index n4 that is identical to the refractive index n1 of the cladding. This does not, however, limit the invention; in a further embodiment, the core 4 could have a refractive index n4 that is different from the refractive index n1 of the background material of the cladding. In all cases, care will be taken to ensure that the refractive index n2 of the inclusions 2 is preferably higher than the refractive index n4 of the core 4. When the core 4 is made of a homogeneous material, its refractive index n4 corresponds to the refractive index of said material. If the core 4 is non-homogeneous, the refractive index of the core will be an average index. Thus, in the present text, the term "refractive index n4" indicates the refractive index of the constitutive material of the core 4 in the case of a homogeneous core, or the average refractive index of the core 4 in the case of a non-homogeneous core 4.

More particularly, the cladding 1 is for instance made of silica. The inclusions 2 are constituted by longitudinal silica pads doped with germanium oxide ($GeO_2$). The inclusions 3 are longitudinal air holes.

The invention is not limited to this particular type of inclusions. For instance, and in a non-exhaustive manner, the inclusions 2 with a higher refractive index could be constituted by silica doped with phosphorus, or by tellurite or chalcogenide glass, etc. The air holes 3 can be replaced by longitudinal cavities filled with a fluid (liquid or gas other than air) presenting a refractive index that is lower than the refractive index (n1) of the background material of the cladding 1 (as for instance water, ethanol). The air holes 3 can be replaced by solid longitudinal pads made of a material presenting a refractive index that is lower than the refractive index n1 of the background material of the cladding 1, as for instance silica doped with fluorine, or silica doped with titanium oxide ($TiO_2$).

Despite the fact that, for the implementation of the invention, silica is a particularly appropriate material for realising the cladding 1, the invention is nevertheless not limited to this sole material. For instance, the background material of the cladding of the optical fibre could be constituted by chalcogenide glass, tellurite glass or any other glass exhibiting negligible absorption in the spectral zones considered by the invention.

The invention is not limited to the implementation of only two different types of inclusions 2 and 3, but in other embodiments, an optical fibre pursuant to the invention can include more than two types of inclusions.

Figure 2:
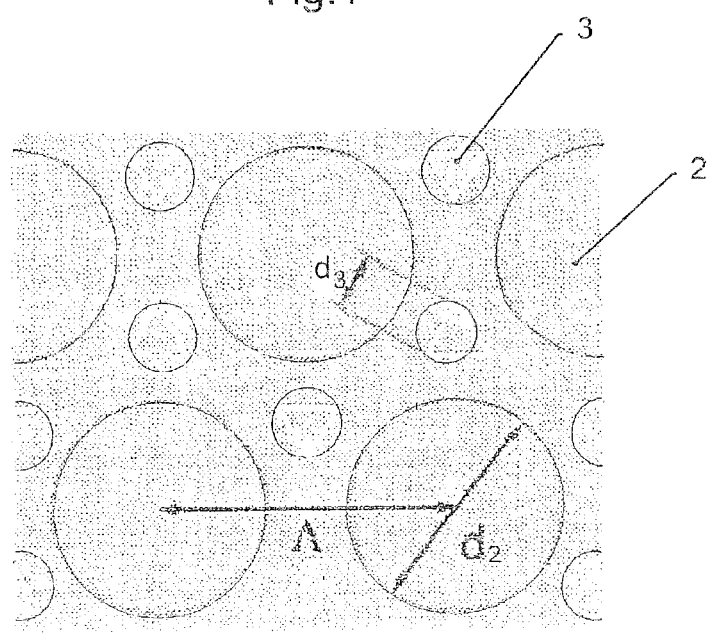
FIG. 2 is an enlarged view of a region of the cross section of FIG. 1.

In FIGS. 1 and 2, the longitudinal inclusions 2 present a circular cross section with a diameter $d_2$, and the longitudinal inclusions 3 present a circular cross section with a diameter $d_3$. The invention is not limited to just these particular forms, the inclusions 2 and 3 being able to show cross sections of forms that are totally different to those illustrated in FIG. 1. In addition, the inclusions 2 (or 3) of the same refractive index are not necessarily identical and can present, in cross section, different dimensions and/or forms.

In the particular example illustrated in FIG. 1, and in a non-limiting manner of the invention, the network of inclusions 2, 3 is periodic and is more particularly of the honeycomb type. With reference to FIG. 2, this periodic network is characterised by a network step $\Lambda$, also commonly referred to as a "pitch", and corresponding in this example to the distance between the centres of the two adjacent inclusions 2.

More particularly in this network of inclusions of the honeycomb type, the inclusions 2 are arranged in the form of concentric hexagonal crowns (three crowns in the illustrated example), and each inclusion 2 is surrounded by six inclusions 3 regularly distributed around its periphery, with the exception of the inclusions 2 of the central crown. The core 4 of the optical fibre (defect in the periodic network) is obtained by withdrawing in the centre of this periodic network one central inclusion 2 and its six peripheral inclusions 3.

It should be noted that the inclusions of the central crown surrounding the core 4 are constituted by inclusions 2 with a high refractive index n2, all the inclusions 3 with a low refractive index n 3 being situated outside this crown that is central with reference to the core. Thus, the light that propagates into the core 4 sees inclusions with a refractive index that is higher than the refractive index n4 of the core 4, which contributes to the obtaining of a guidance by total internal reflection. Conversely, if in such a periodic network, the central crown surrounding the core was constituted by inclusions 3 with a low refractive index n3 (n3<n4), such a mode of propagation by total internal reflection would be difficult to achieve.

In the example of FIG. 1, the core 4 is homogeneous and constituted of the same material as the background material of the cladding. In the context of the invention, it is possible to introduce into the core 4 defects that can be non periodic and of a very small dimension with reference in particular to the step $\Lambda$ of the network, such as micrometric air holes, on the condition that the refractive index n2 of the inclusions 2 of the central crown surrounding the core 4 is higher than the refractive index n4 of the core 4.

Despite the fact that the implementation of a periodic network of inclusions, in particular of the honeycomb type, is particularly adapted for realising a microstructured optical fibre of the invention, the invention is not limited to this sole type of configuration of the inclusions, but also extends more generally to any distribution of inclusions in a cross section (periodic, non-periodic distribution, or including both periodic regions and non-periodic regions) enabling the technical characteristic features of claim 1 to be obtained.

In the rest of the description and for reasons of clarity and simplification of the presentation of the invention, the technical considerations are applied to a microstructured optical fibre presenting the cross section of FIGS. 1 and 2, with a silica cladding 1, inclusions 2 of silica doped with germanium oxide ($GeO_2$), and inclusions 3 constituted by air holes. Nevertheless, it is in the immediate scope and within the normal competencies of a person skilled in the art to adapt and to transpose these technical considerations to realise an optical fibre responding to the invention and exhibiting a different cross-sectional structure.

Figure 3:
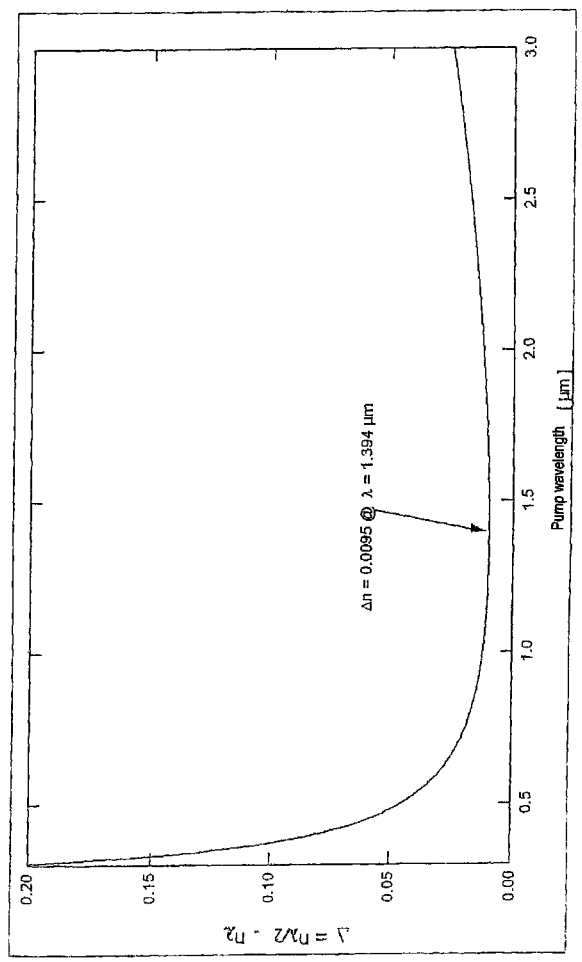
FIG. 3 is a curve representing the variation of the differential (Δ) of the refractive index of the pure silica at two wavelengths λ/2 and λ, for pump wavelengths λ between 0.3 μm and 3 μm, the refractive index of the silica following the Sellmeier Law.
Figure 4:
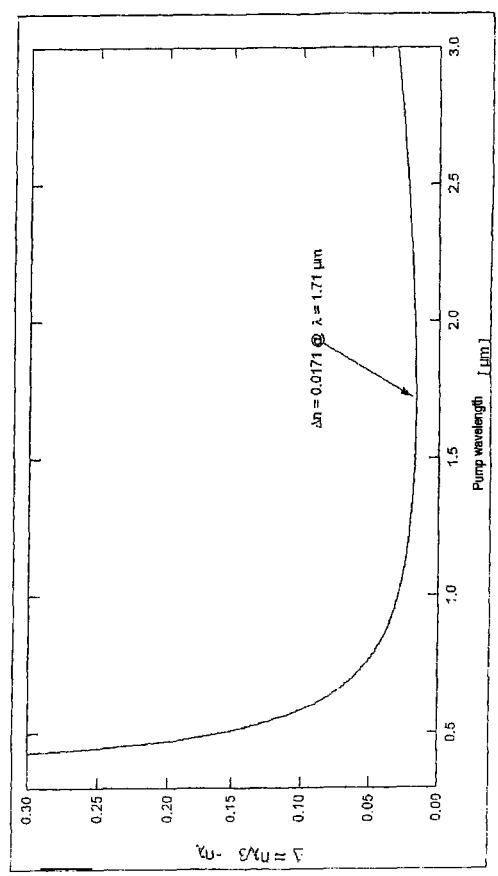
FIG. 4 is a curve representing the variation of the differential (Δ) of the refractive index of the pure silica at two wavelengths λ/3 and λ, for pump wavelengths λ between 0.3 μm and 3 μm, the refractive index of the silica following the Sellmeier Law.

FIGS. 3 and 4 have been calculated while taking into consideration that the refractive index of the silica follows the Sellmeier Law (I. H. Malitson, "Interspecimen Comparison of the Refractive Index of Fused Silica", JOSA 55, 1205 (1965)). These FIGS. 3 and 4 show that with a homogeneous material with an index n1, the differential ($\Delta$) of the refractive index is never zero, but crosses a minimum. The result is that the refractive indices $n_\lambda$ and $n_\lambda/2$ of the two wavelengths $\lambda$ and $\lambda/2$ are never equal, and that the refractive indices $n_\lambda$ and $n_\lambda/3$ of the two wavelengths $\lambda$ and $\lambda/3$ are never equal. Thus, with a homogeneous material of the index n1, it is not possible to have a phase index match between two wavelengths [(FIG. 3—$\lambda$ and $\lambda/2$); (FIG. 4—$\lambda$ and $\lambda/3$)].

In the optical fibre of the invention, the inclusions 2 and 3 are dimensioned and arranged in such a way that said fibre enables a guidance of a fundamental mode (of the quasi-Gaussian type) of the light by photonic forbidden bands, and a guidance of a fundamental mode (of the quasi-Gaussian type) of the light by total internal reflection, following the same direction of propagation (longitudinal direction of the fibre), the fundamental mode guided in the first photonic forbidden band (BG1) and the fundamental mode guided by total internal reflection being centred respectively on the different wavelengths $\lambda_{BG1}$, and $\lambda_{RTI}$.

More particularly, according to an optional and additional characteristic, the optical fibre of the invention enables a phase index match for these two wavelengths ($\lambda_{RTI}$; $\lambda_{BG1}$) between the fundamental mode guided in the first forbidden band (BG1) and the fundamental mode guided by total internal reflection, and in particular for two double or triple wavelengths ($\lambda_{RTI}$; $\lambda_{BG1}$).

In an optical fibre presenting the particular structure of FIG. 1, the appearance of these two guidance modes of the light depends in particular on the diameter ($d_3$) of the inclusions with an index n3. This will be better understood in light of FIGS. 5 to 12, which shall be described in more detail hereinafter.

Figure 5:
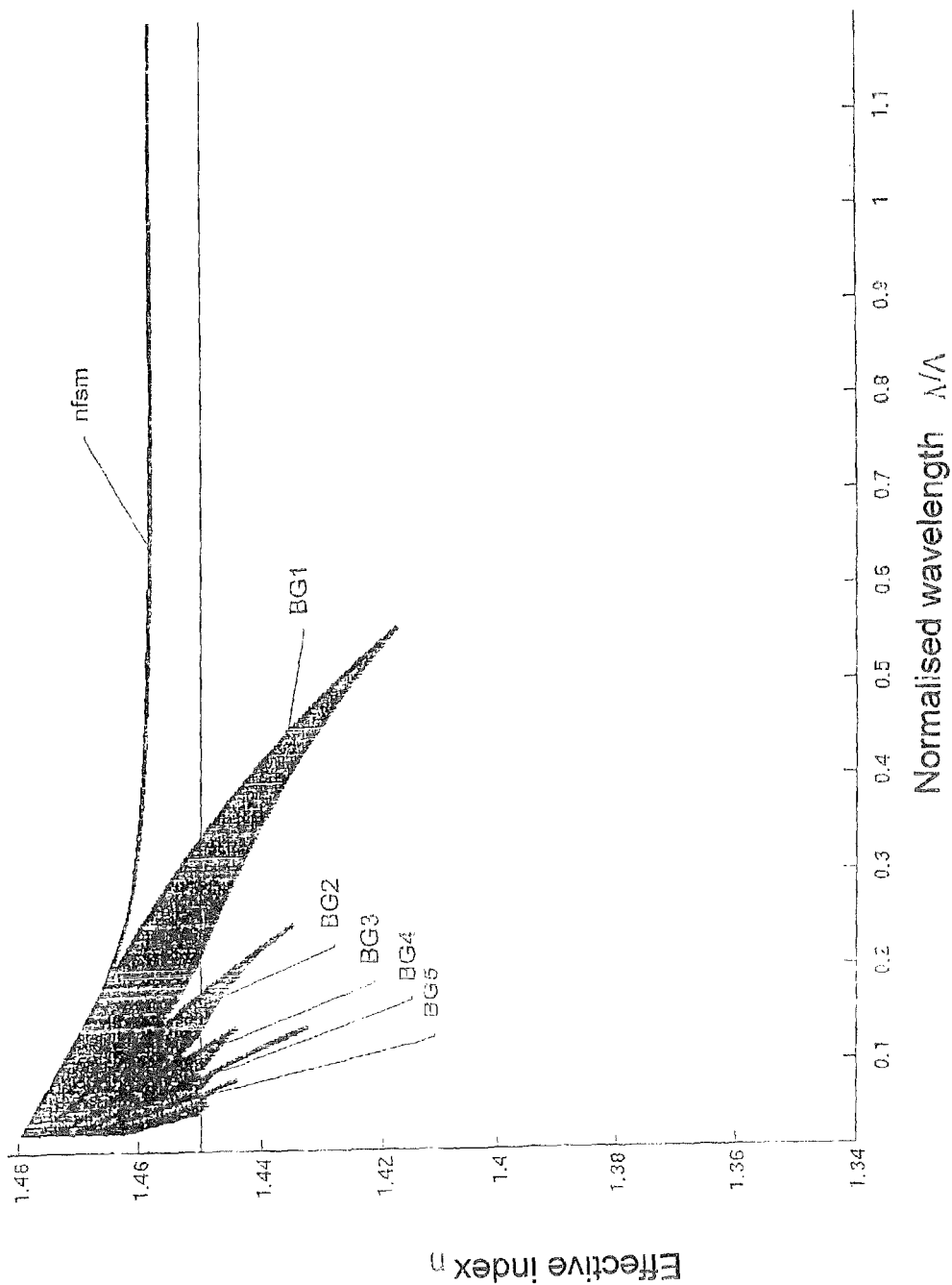
FIG. 5 is a diagram of the photonic forbidden bands of an optical fibre including the same network of inclusions having a higher refractive index than the fibre of FIG. 1, but without a defect in the centre and without the inclusion of a lower index (air holes), the silica index being understood to be constant and equal to 1.45.
Figure 6:
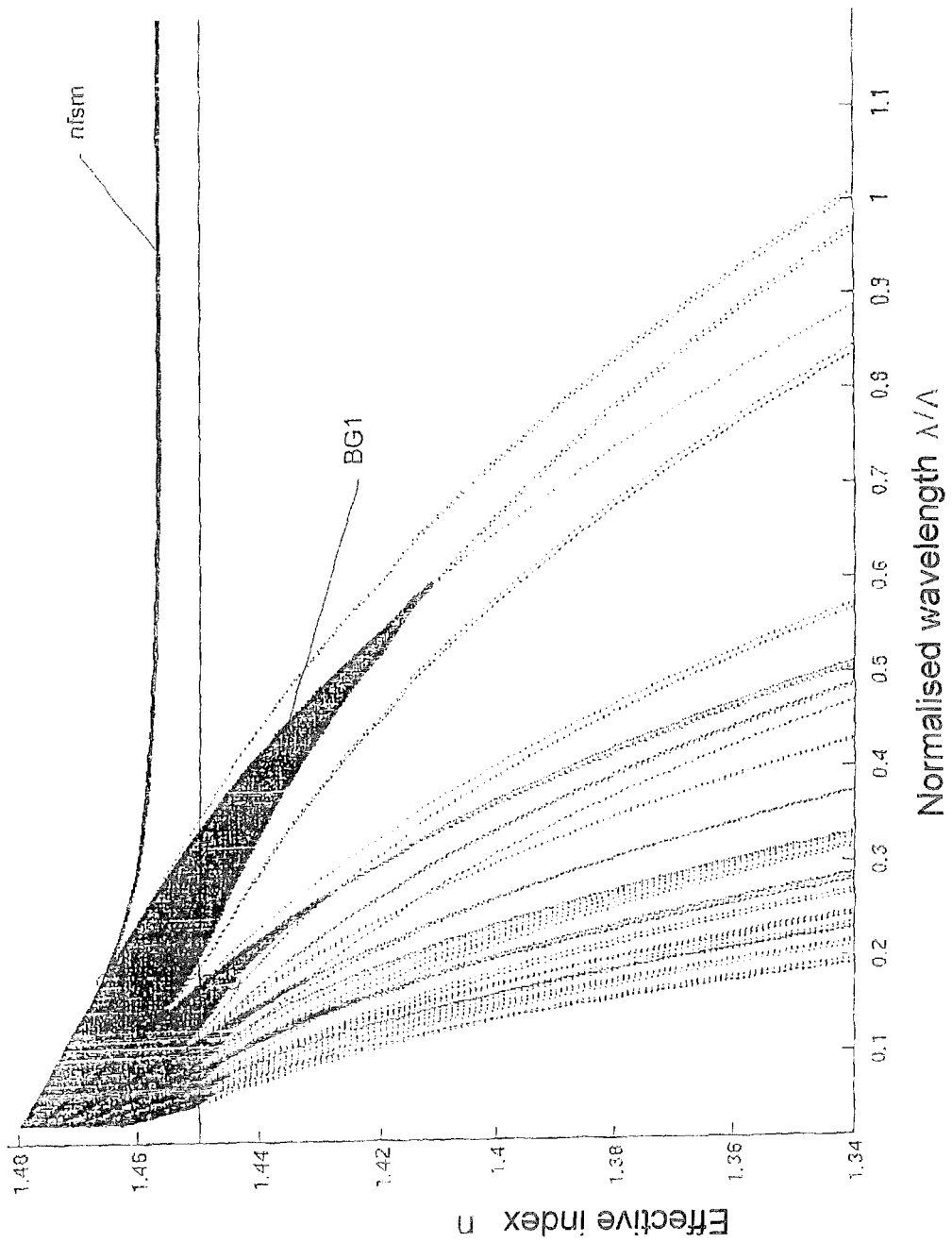
FIG. 6 is a diagram of photonic forbidden bands of an optical fibre including the same network of inclusions as the fibre of FIG. 1, but without a defect in the centre, the ratio $d_3/\Lambda$ of the index $n_3$ inclusions equalling 0.04, the silica index being understood to be constant and equal to 1.45.
Figure 7:
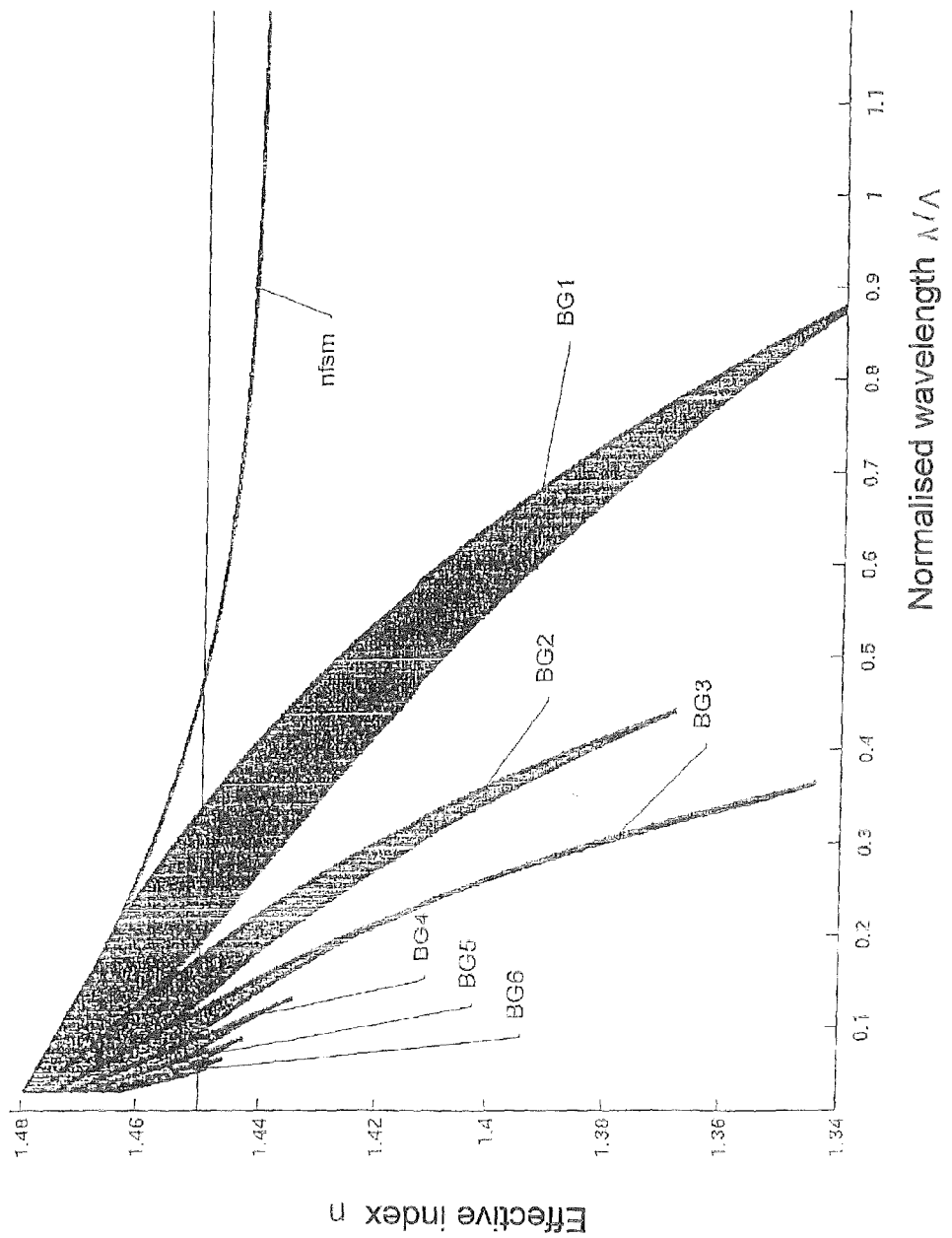
FIG. 7 is a diagram of photonic forbidden bands of an optical fibre including the same network of inclusions as the fibre of FIG. 1, but without a defect in the centre, the ratio $d_3/\Lambda$ of the index $n_3$ inclusions of the network equalling 0.1518, the silica index being understood to be constant and equal to 1.45.

The curves of FIGS. 5 to 7 were obtained with the help of the MIT Photonic-bands (MPB) software. This software uses the plane-wave development method to calculate the structure of photonic forbidden bands in a periodic structure. The silica index is assumed to be constant and equal to 1.45 for the diagrams of FIGS. 5 to 7.

Ref: Steven G. Johnson and J. D. Joannopoulos, "Block-iterative frequency-domain methods for Maxwell's equations in a planewave basis (http://www.opticsexpress.org/abstract.cfm?URI=OPEX-8-3-173)", Optics Express 8 (3)173-190 (2001).

The results of the curves of FIGS. 8 to 12 were obtained by a vectorial calculation method of finished elements implemented by means of the COMSOL Multiphysics™ software (version 3.3a). This calculation method consists in resolving the Helmholtz equation in a cross section of the fibre for a given wavelength and in deducting the effective index of the fundamental mode in function of the wavelength.

In these calculations, for the inclusions 3 of a low index (air holes), the refractive index of these inclusions was equal to 1. For the inclusions 2 of a high index, the calculations were carried out by modelling the refractive index of each inclusion 2 of a high index by the following parabolic law:

$$n(r) = -\frac{\Delta n}{R^2}r^2 + \Delta n \div n1$$

Where r is the distance from the centre of the inclusion, R is the radius of the inclusion, $\Delta n$ is the difference of the refractive index between the inclusions 2 of a high index and that of the silica n1. It should moreover be taken into consideration that n1 follows the Sellmeier Law (I. H. Malitson, "Interspecimen Comparison of the Refractive Index of Fused Silica", JOSA 55, 1205 (1965)). For the calculations, $\Delta n$ was a constant measuring $32 \times 10^{-3}$.

The curves of FIGS. 5 to 12 have furthermore been calculated for optical fibres of which the network of inclusions presents the following geometrical characteristic features (common to FIGS. 5 to 12):

$d2/\Lambda = 0.725$, where:
  d2 is the diameter of the inclusions 2,
  $\Lambda$ is the distance between two centres of inclusions 2 (network step).

FIGS. 5 to 7—Influence of d3/$\Lambda$ Ratio on the Appearance of the Guidance Mode by Total Internal Reflection The diagrams of the photonic forbidden bands of FIGS. 5 to 7 have been calculated for an optical fibre including the cross-sectional structure of FIG. 1, but without the central defect 4 in the periodic network of inclusions. Furthermore, in these FIGS. 5 to 7, in addition to the photonic forbidden bands (BG1, BG2, BG3, etc.), the variation of the average effective index of the cladding of the optical fibre (i.e. the average index that the homogeneous material corresponding to the microstructured material of the cladding would have, the cladding being characterised by a periodic network of inclusions of a refractive index n3 and n2) has been represented (curve referenced nfsm) in function of the normalised wavelength $\lambda/\Lambda$). The calculation is realised on the additional assumption that the silica index is constant and assumed to be equal to 1.45.

More particularly, for FIG. 5, the calculations have been carried out for a network including only inclusions 2 of a high index (silica doped with germanium) and not including air holes 3. The nfsm curve remains above 1.45 (refractive index of pure silica), which proves that it is not possible with such a fibre to guide a fundamental mode of the light by total internal reflection.

For FIG. 6, the calculations have been carried out for a network including both inclusions 2 of a high index (silica doped with germanium) and inclusions 3 of a low index (air holes), and for a ratio of the diameter $d_3$ of the inclusions with an index n3 on the step $\Lambda$ equalling 0.04. The nfsm curve remains above 1.45 (refractive index of pure silica), which proves that it is not possible with such a fibre to guide a fundamental mode of the light by total internal reflection, the radius of the inclusions with an index n3 being too low to significantly lower the average refractive index nfsm.

For FIG. 7, the calculations have been carried out for a network including both inclusions 2 of a high index (silica doped with germanium) and inclusions 3 of a low index (air holes), and for a ratio of the diameter of the inclusions with a refractive index n3 on the step of the network $\Lambda$ equalling 0.1518. The nfsm curve passes below 1.45 (refractive index of pure silica), which proves that it is possible with such a fibre to guide a fundamental mode of the light, not only by photonic forbidden bands, but also by total internal reflection, the ratio $d_3/\Lambda$ of the inclusions with a refractive index n3 being sufficiently significant, and in particular sufficiently significant for the average effective index (nfsm) of the cladding 1 to be lower than the refractive index n1 of the background material of the cladding 1, at least for a wavelength range higher than the wavelength $\lambda_{BG1}$ of the fundamental mode guided in the first photonic forbidden band (BG1).

FIGS. 8 to 12—Phase Index Match

Figure 8:
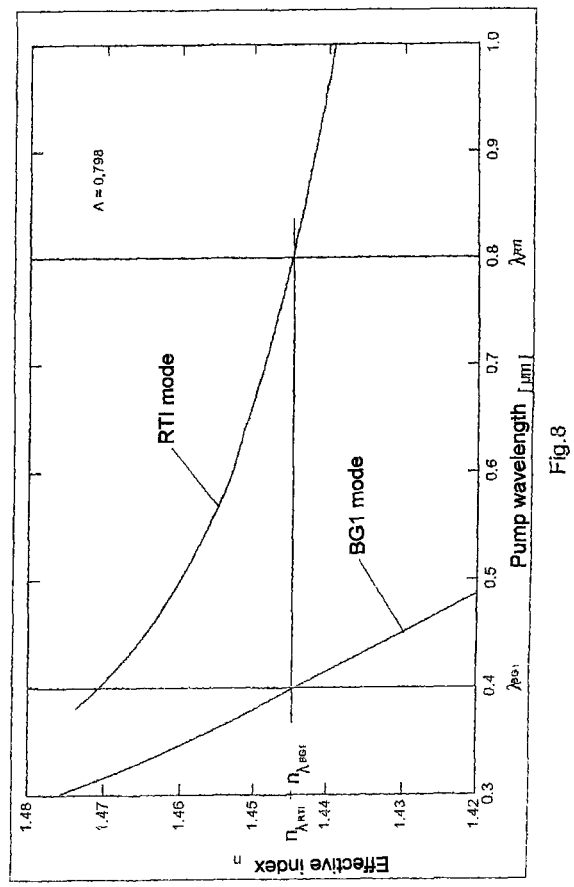
FIG. 8 is a diagram showing the effective index variation, in function of the wavelength (in μm), of the fundamental modes in the first photonic forbidden band (BG1) and in the total internal reflection band (RTI) of a microstructured optical fibre according to FIG. 1, and characterised by an inclusions network step Λ equalling 0.798 μm and by a ratio $d_3/\Lambda$ of the index $n_3$ inclusions equalling 0.1518, the silica index varying according to the Sellmeier Law.

The development of the effective index (n) of the fundamental mode in the first photonic forbidden band (BG1) and in the total internal reflection band (RTI) for an optical fibre according to FIGS. 1 and 2 (with inclusions 2 in silica doped with germanium and inclusions 3 formed by air holes) has been calculated for various step ($\Lambda$) values of the network of inclusions. The results of these calculations correspond to the curves of FIGS. 8 to 12. The refractive index n1 evolves according to the Sellmeier Law. The values of the step ($\Lambda$) of the network of inclusions were the following:
FIG. 8: $\Lambda=0.798$ μm
FIG. 9: $\Lambda=1.386$ μm
FIG. 10: $\Lambda=1.785$ μm
FIG. 11: $\Lambda=0.588$ μm
FIG. 12: $\Lambda=0.92$ μm In these FIGS. 8 to 12, the referenced left curve (BG1 mode) shows the variation of the effective index (n), in function of the wavelength (in μm), of the fundamental mode (of the quasi-Gaussian type) guided in the first photonic forbidden band (BG1); the referenced right curve (RTI mode) shows the variation of the effective index (n), in function of the wavelength (in μm), of the fundamental mode (of the quasi-Gaussian type) guided in the core by total internal reflection (RTI).

In this microstructured optical fibre of the invention, the inclusions 2 of a high refractive index are responsible for the appearance of a guidance mechanism along the longitudinal axis of the fibre of a fundamental mode of the light by photonic forbidden bands, and the inclusions 3 of a low refractive index are responsible for the appearance of a guidance mechanism along the longitudinal axis of the fibre of a fundamental mode of the light by total internal reflection.

The curves of FIGS. 8 to 12 show that in each case it is possible with this microstructured optical fibre to have an equality of effective indices (n) of the fundamental mode:
  (i) at two different wavelengths $\lambda_{BG1}$ and $\lambda_{RTI}$, and
  (ii) for an effective index (n) value that is lower than the refractive index of the background material of the cladding 1.

The result is a phase index match at the wavelengths $\lambda_{BG1}$ and $\lambda_{RTI}$ between respectively the fundamental mode guided in the first forbidden band (BG1) and the fundamental mode guided by total internal reflection. It should also be noted that in FIGS. 8 to 12, the difference between said wavelengths $\lambda_{BG1}$ and $\lambda_{RTI}$ is such that the wavelength $\lambda_{RTI}$ is situated beyond the range of wavelengths of the fundamental mode guided in the first forbidden band (BG1).

This phase index match enables the optical fibre to be used for a combination of at least three waves, phase-matched, with at least two of these waves possessing respectively the wavelengths $\lambda_{BG1}$ and $\lambda_{RTI}$. The optical fibre can thus be advantageously used to generate, with a high optical yield, a fundamental mode centred on a wavelength $\lambda_{BG1}$ from a fundamental mode centred on a wavelength $\lambda_{RTI}$ of a higher pump. Obviously, in the case for instance of doubling of frequency (respectively of tripling of frequency), in a manner known to the person skilled in the art, it must be ensured that the optical fibre also exhibits a susceptibility $\chi^{(2)}$ (respectively $\chi^{(3)}$), which can be achieved by a so-called poling method, as is taught for instance in: P. G. Kazansky, L. Dong and P. Russell "High second order nonlinearities in poled silicate fiber", Vol. 19, No. 10, p. 701 (1994) Optics Letters.

More particularly in the examples of FIGS. 8 to 12, the phase index match can advantageously be obtained for a combination of waves with doubling or tripling of frequency at the following wavelengths:

FIG. 8: $\lambda_{BG1}$=0.4 μm and $\lambda_{RTI}$=0.8 μM (doubling of frequency)

Figure 9:
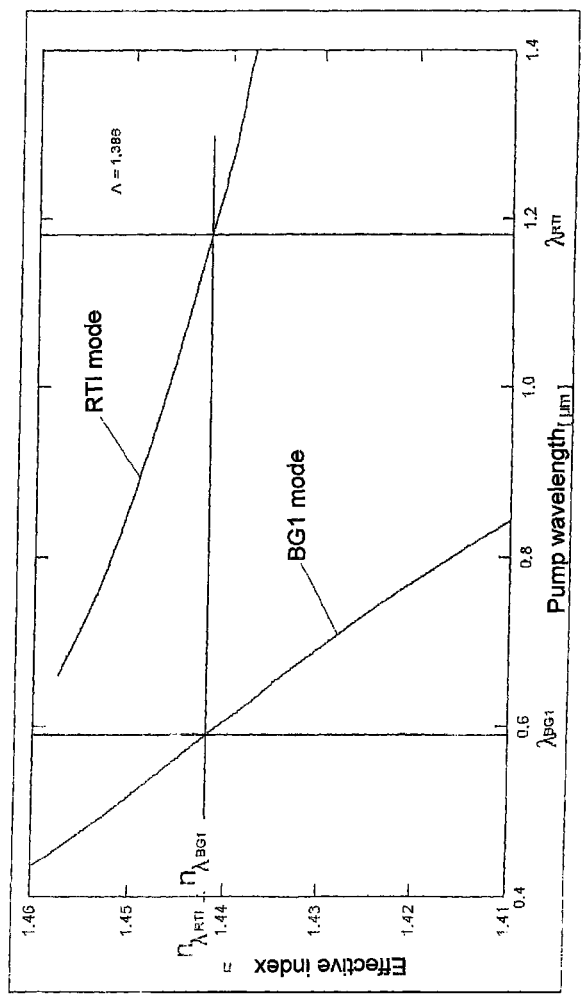
FIG. 9 is a diagram showing the effective index variation, in function of the wavelength (in μm), of the fundamental modes in the first photonic forbidden band (BG1) and in the total internal reflection band (RTI) of a microstructured optical fibre according to FIG. 1, and characterised by an inclusions network step Λ equalling 1.386 μm and by a ratio $d_3/\Lambda$ of the index $n_3$ inclusions equalling 0.1518, the silica index varying according to the Sellmeier Law.

FIG. 9: $\lambda_{BG1}$=0.59 μm and $\lambda_{RTI}$=1.18 μm (doubling of frequency)

Figure 10:
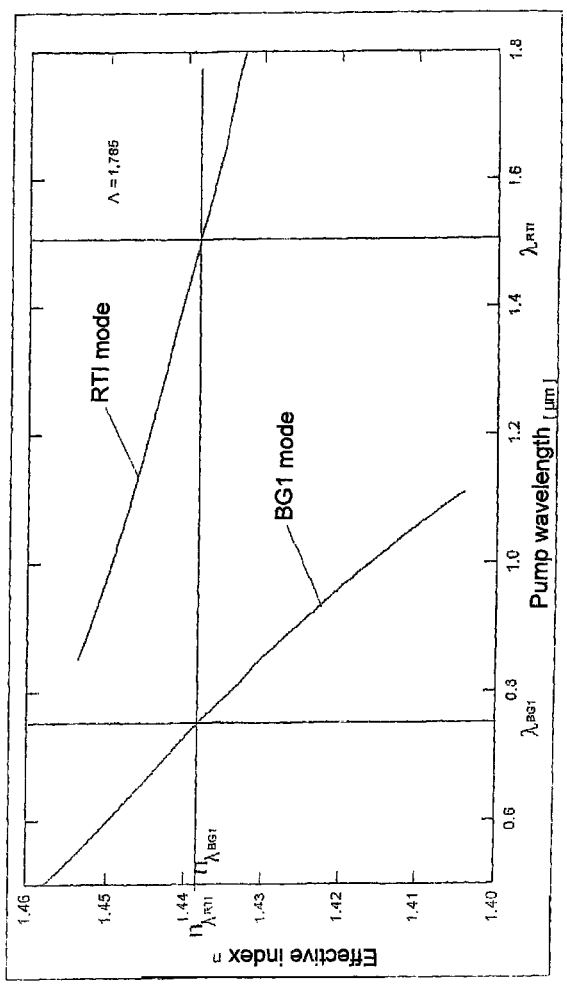
FIG. 10 is a diagram showing the effective index variation, in function of the wavelength (in μm), of the fundamental modes in the first photonic forbidden band (BG1) and in the total internal reflection band (RTI) of a microstructured optical fibre according to FIG. 1, and characterised by an inclusions network step Λ equalling 1.785 μm and by a ratio $d_3/\Lambda$ of the index $n_3$ inclusions equalling 0.1518, the silica index varying according to the Sellmeier Law.

FIG. 10: $\lambda_{BG1}$=0.75 μm and $\lambda_{RTI}$=1.5 μm (doubling of frequency)

Figure 11:
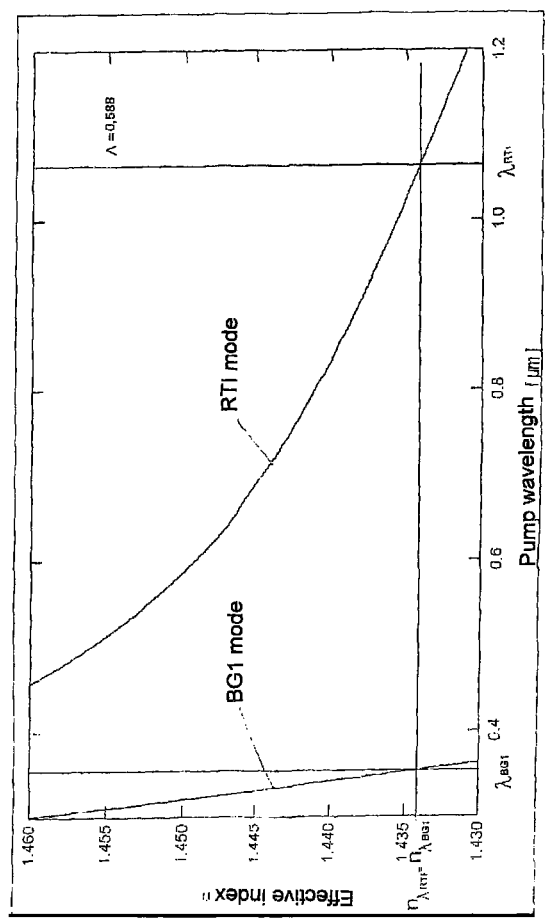
FIG. 11 is a diagram showing the effective index variation, in function of the wavelength (in μm), of the fundamental modes in the first photonic forbidden band (BG1) and in the total internal reflection band (RTI) of a microstructured optical fibre according to FIG. 1, and characterised by an inclusions network step Λ equalling 0.585 μm and by a ratio $d_3/\Lambda$ of the index $n_3$ inclusions equalling 0.1518, the silica index varying according to the Sellmeier Law.

FIG. 11: $\lambda_{BG1}$=0.354 μm and $\lambda_{RTI}$=1.064 μm (tripling of frequency)

Figure 12:
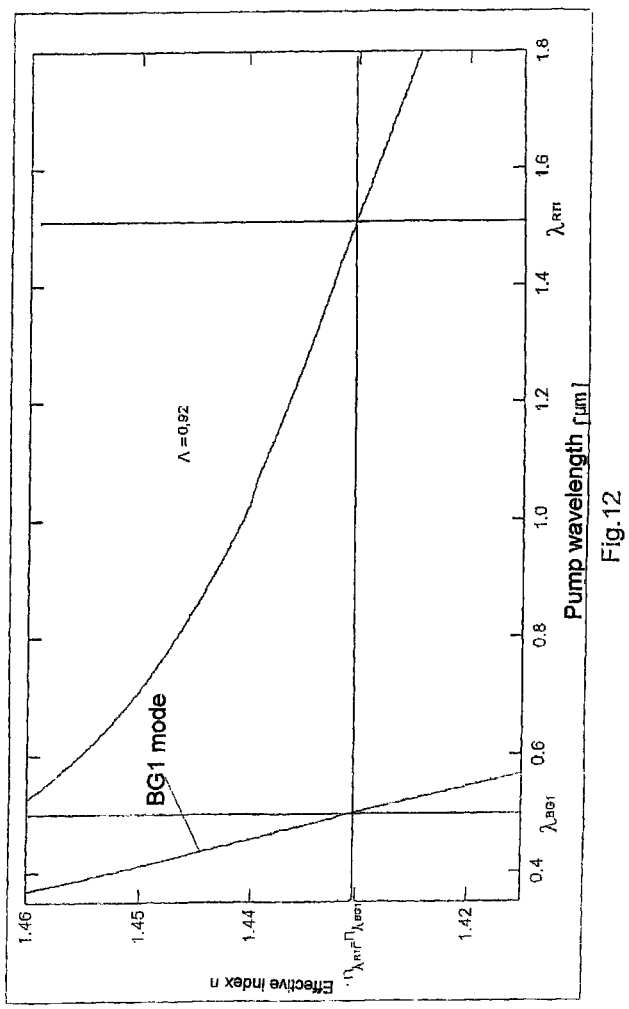
FIG. 12 is a diagram showing the effective index variation, in function of the wavelength (in μm), of the fundamental modes in the first photonic forbidden band (BG1) and in the total internal reflection band (RTI) of a microstructured optical fibre according to FIG. 1, and characterised by an inclusions network step Λ equalling 0.92 μm and by a ratio $d_3/\Lambda$ of the index $n_3$ inclusions equalling 0.1518, the silica index varying according to the Sellmeier Law.

FIG. 12: $\lambda_{BG1}$=0.5 μm and $\lambda_{RTI}$=1.5 μm (tripling of frequency)

The examples of FIGS. 8 to 12 do not limit and are not exhaustive of the invention. More generally, the wavelengths ($\lambda_{RTI}$; $\lambda_{BG1}$) corresponding to a phase index match can be a whole multiple of each other ($\lambda_{RTI}$=k·$\lambda_{BG1}$, k being a whole number above or equal to 2).

Figure 13:
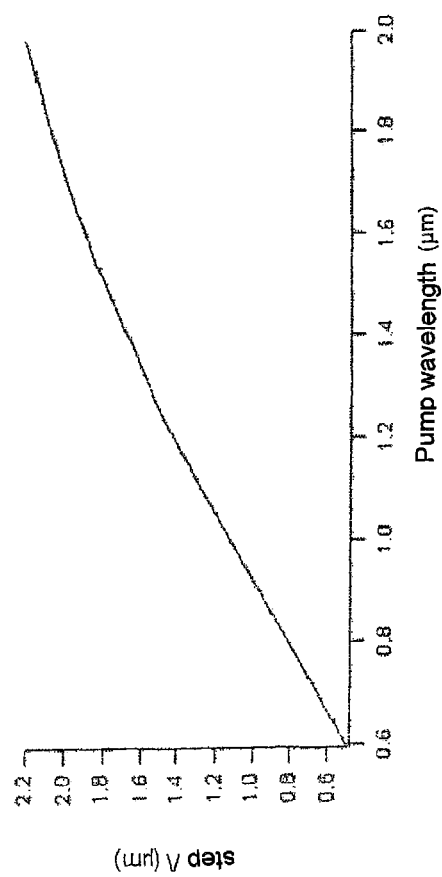
FIG. 13 is a curve representing the development (in μm) of the network step Λ of an optical fibre according to FIG. 1, in function of a pump length $\lambda_{RTI}$ between 0.6 μm and 2 μm, for obtaining a doubling of frequency from this pump wavelength, the silica index varying according to the Sellmeier Law.
Figure 14:
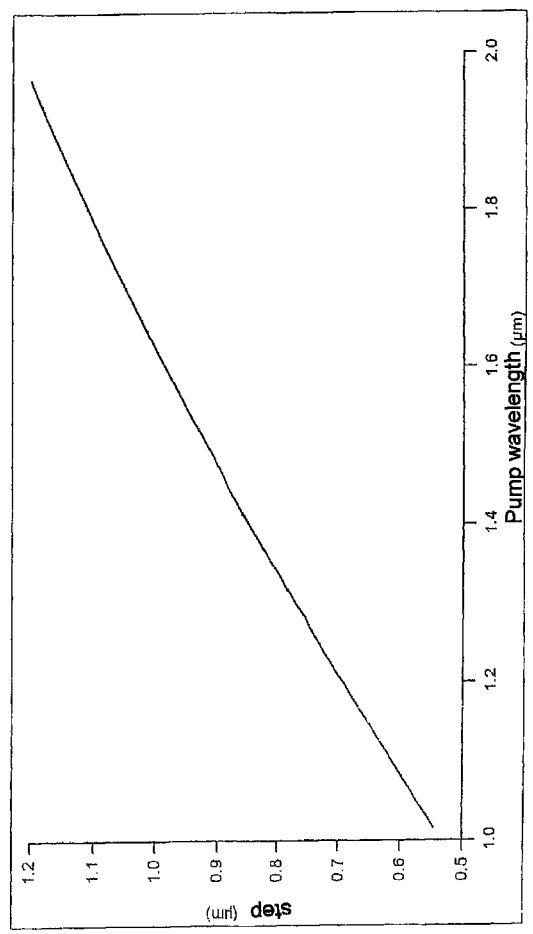
FIG. 14 is a curve representing the development (in μm) of the network step Λ of an optical fibre according to FIG. 1, in function of a pump length $\lambda_{RTI}$ between 1 μm and 2 μm, for obtaining a tripling of frequency from this pump wavelength, the silica index varying according to the Sellmeier Law.

The curves of FIGS. 13 and 14 show the development of the step Λ of the network of inclusions 2, 3 in function of the pump wavelength $\lambda_{RTI}$, to obtain respectively a doubling of frequency or a tripling of frequency, from this pump wavelength $\lambda_{RTI}$. These curves of FIGS. 13 and 14 show that it is possible also to obtain a phase index match with a doubling of frequency or a tripling of frequency for other values of the step Λ of the network of inclusions 2, 3. The same applies as far as the tripling of frequency is concerned, or more generally the generation of a frequency that is a whole multiple of the pump frequency.

Figure 15:
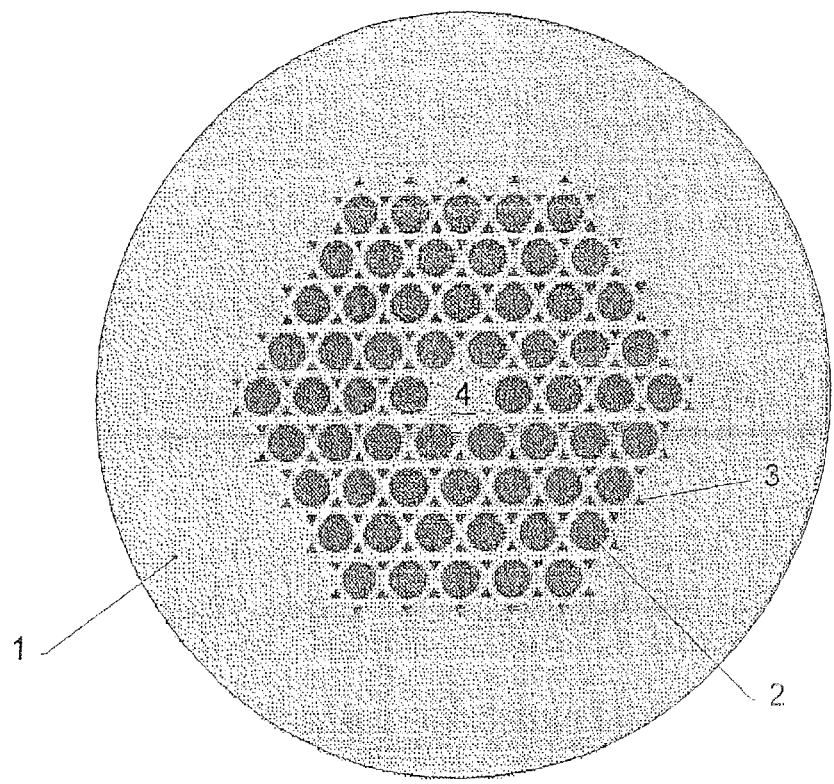
FIG. 15 is a cross-sectional view of a microstructured optical fibre according to a second embodiment of the invention.
Figure 16:
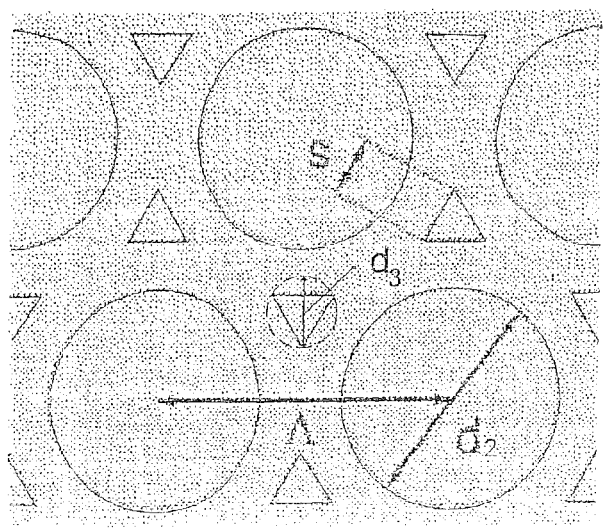
FIG. 16 is an enlarged view of a region of the cross section of FIG. 15.

As an example, a further embodiment of an optical fibre of the invention is shown in FIGS. 15 and 16, in which the inclusions with an index (n3) present a cross section in the shape of an equilateral triangle of a width (s), inscribed in a (imaginary) circle of a diameter d3.

The invention is not limited to a microstructured optical fibre as described with reference to the annexed drawings and usable only for the doubling of frequency or the tripling of frequency through non-linear effects. More generally, the inclusions (2, 3) of the cladding of the microstructured optical fibre of the invention can be arranged in such a manner as to permit a combination of (m) wavelengths through non-linear effects, m being a whole number above or equal to 3, the inclusions of the cladding of the optical fibre of the invention being such that the fundamental mode guided in the first photonic forbidden band (BG1) and the fundamental mode guided by total internal reflection (RTI) cumulatively respect the following conditions (a) and (b):

$$\sum_{i=1}^{m} \frac{1}{\lambda_i} = 0 \quad (a)$$

$$\sum_{i=1}^{m} \frac{n_{\lambda_i}}{\lambda_i} = 0 \quad (b)$$

m being a whole number above or equal to 3, and $n_{\lambda_i}$ being the value of the effective index of the fundamental mode propagating itself in the optical fibre at the wavelength $\lambda_i$.

In addition, according to the invention, among the wavelengths $\lambda_i$ respecting the conditions (a) and (b), at least one wavelength ($\lambda_{RTI}$) belongs to the fundamental mode guided by total internal reflection (RTI), and at least one wavelength ($\lambda_{BG1}$) belongs to the fundamental mode guided in the first forbidden band (BG1).

The conditions (a) and (b) described above correspond respectively to the condition of energy conservation of the photons and to the condition of conservation of the wavelength vector, with the following sign conventions: the wavelength is considered negative when the photon is annihilated, and positive when the photon is created by the combination mechanism of m wavelengths.

For instance, in the particular case of a combination of three wavelengths with the creation of a photon at $w_3$ (m=3 and $w_1+w_2$ $w_3$), the above-cited conditions (a) and (b) become:

$$\frac{1}{\lambda_1} + \frac{1}{\lambda_2} + \frac{1}{\lambda_3} = 0 \quad (a)$$

$$\frac{n_{\lambda_1}}{\lambda_1} + \frac{n_{\lambda_2}}{\lambda_2} + \frac{n_{\lambda_3}}{\lambda_3} = 0 \quad (b)$$

For instance, in the particular case of a combination of four wavelengths with the creation of a photon at $w_4$ (m=4 and $w_1+w_2+w_3 \rightarrow w_4$), the above-cited conditions (a) and (b) become:

$$\frac{1}{\lambda_1} + \frac{1}{\lambda_2} + \frac{1}{\lambda_3} + \frac{1}{\lambda_4} = 0 \quad (a)$$

$$\frac{n_{\lambda_1}}{\lambda_1} + \frac{n_{\lambda_2}}{\lambda_2} + \frac{n_{\lambda_3}}{\lambda_3} + \frac{n_{\lambda_4}}{\lambda_4} = 0 \quad (b)$$

Figure 17:
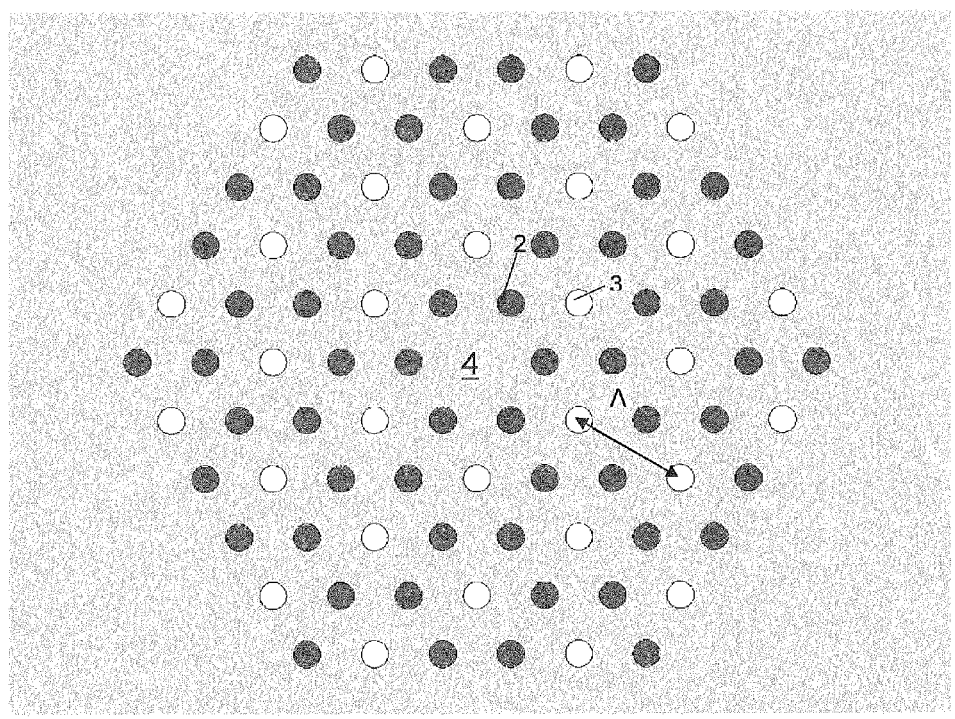
FIG. 17 is a cross-sectional view of a microstructured optical fibre according to a third embodiment of the invention.
Figure 22:
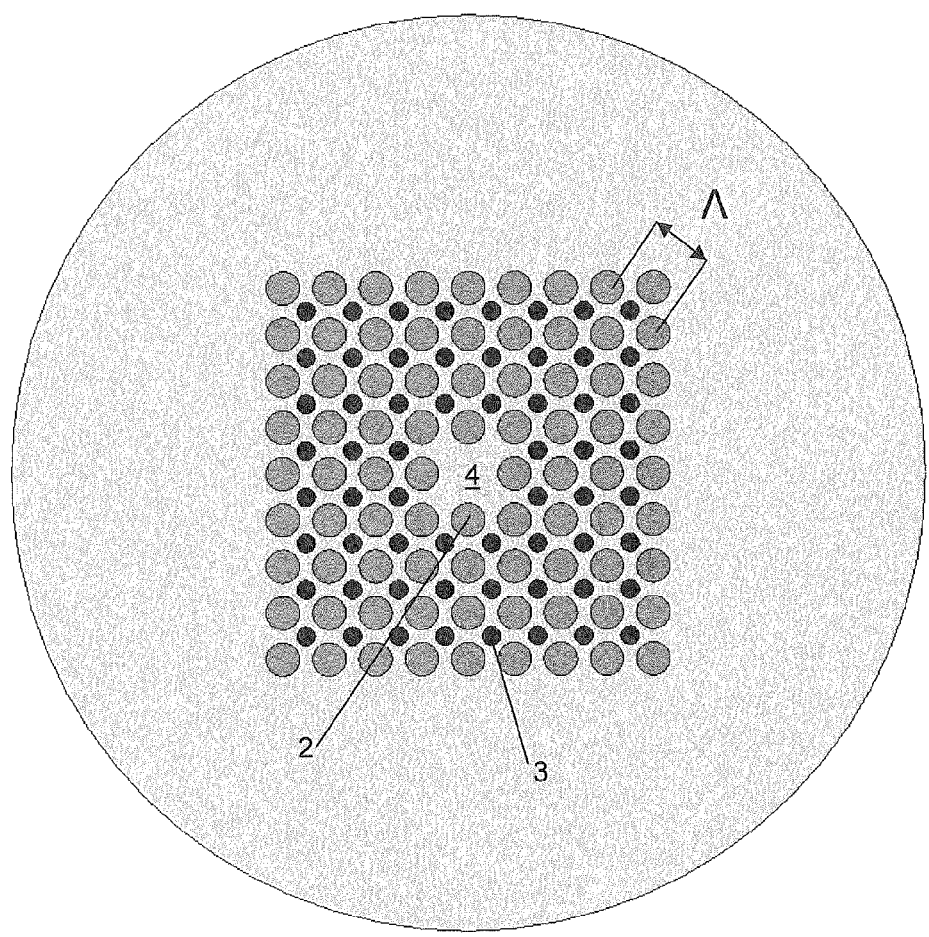
FIG. 22 is a cross-sectional view of a microstructured optical fibre according to a fourth embodiment of the invention.

FIGS. 17 and 22 show two other embodiments of a fibre of the invention including inclusions 2, 3 forming a periodic step (pitch) Λ network.

In the embodiment of FIG. 17, the inclusions 2 and 3 are identical in size and in form and differ only in their respective refractive indices n2 and n3. In a manner similar to the embodiments of FIGS. 1 and 15, the core 4 is surrounded by a central hexagonal crown constituted by the inclusions 2 of a high refractive index n2, the inclusions 3 of a low refractive index n3 all being situated outside this central crown.

The inclusions 2 of a high refractive index n2 are for instance inclusions of silica doped with germanium and the inclusions 3 of a low refractive index n3 are for instance air holes.

Figure 18:
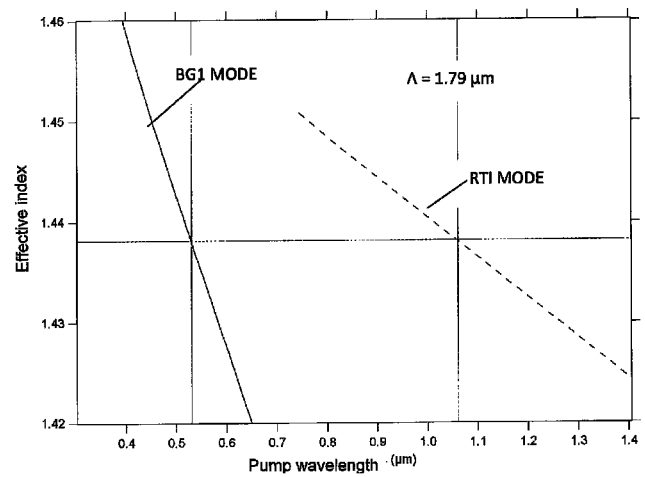
FIG. 18 is a diagram showing the effective index variation, in function of the wavelength (in μm), of the fundamental modes in the first photonic forbidden band (BG1) and in the total internal reflection band (RTI) of a microstructured optical fibre according to FIG. 17, and characterised by an inclusions network step Λ equalling 1.79 μm and by a ratio $d_3/\Lambda$ of the index $n_3$ inclusions equalling 0.4, the silica index varying according to the Sellmeier Law.
Figure 19:
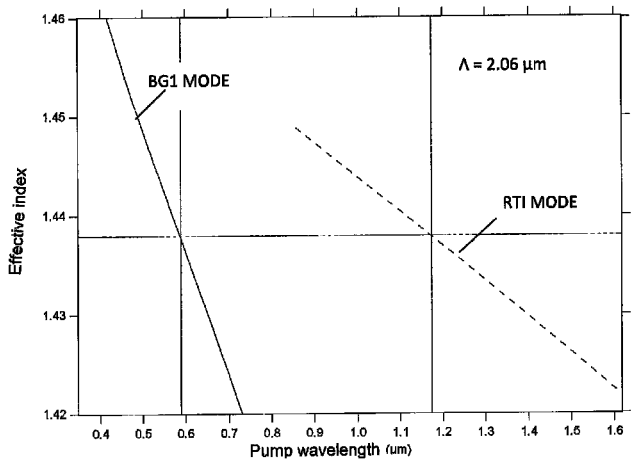
FIG. 19 is a diagram showing the effective index variation, in function of the wavelength (in μm), of the fundamental modes in the first photonic forbidden band (BG1) and in the total internal reflection band (RTI) of a microstructured optical fibre according to FIG. 17, and characterised by an inclusions network step Λ equalling 2.06 μm and by a ratio $d_3/\Lambda$ of the index $n_3$ inclusions equalling 0.4, the silica index varying according to the Sellmeier Law.
Figure 20:
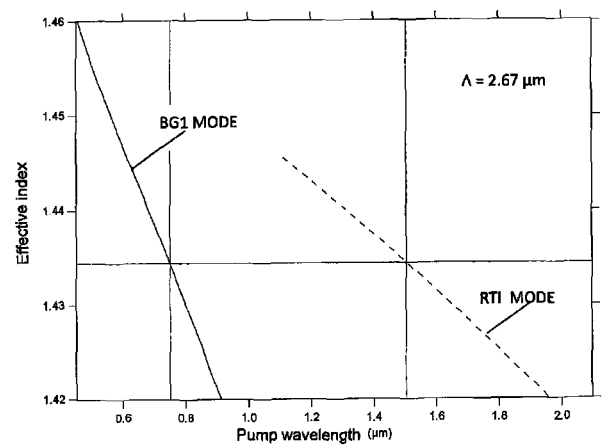
FIG. 20 is a diagram showing the effective index variation, in function of the wavelength (in μm), of the fundamental modes in the first photonic forbidden band (BG1) and in the total internal reflection band (RTI) of a microstructured optical fibre according to FIG. 17, and characterised by an inclusions network step Λ equalling 2.67 μm and by a ratio $d_3/\Lambda$ of the index $n_3$ inclusions equalling 0.4, the silica index varying according to the Sellmeier Law.
Figure 21:
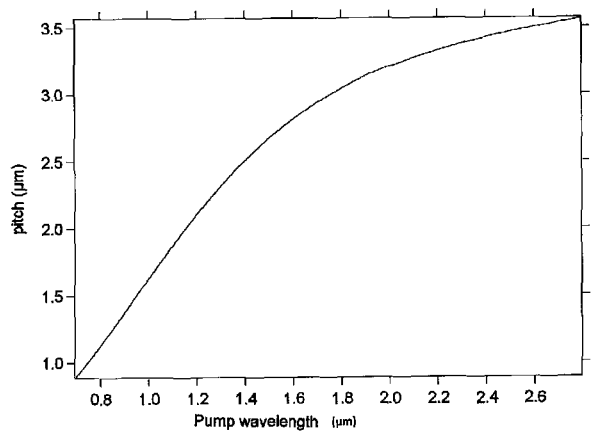
FIG. 21 is a curve representing the development (in μm) of the network step Λ of an optical fibre according to FIG. 17, in function of a pump length between 0.8 μm and 3 μm, for obtaining a doubling of frequency from this pump wavelength, the silica index varying according to the Sellmeier Law.

The curves of FIGS. 18 to 20 show the development of the effective refractive index (n) of the fundamental mode in the first photonic forbidden band (BG1) and guided by total internal reflection (RTI) for an optical fibre according to FIG. 17 (with inclusions 2 of silica doped with germanium and inclusions 3 formed by air holes).

These curves have been obtained in the same manner as the curves of FIGS. 8 to 12 and with the following parameters:
d2/Λ=d3/Λ=0.4
Λn=32×10$^{-3}$
FIG. 18: Λ=1.79 μm
FIG. 19: Λ=2.06 μm
FIG. 20: Λ=2.67 μm The curves of FIGS. 18 to 21 show that for different steps Λ of the network, it is possible to realise a combination of three phase-matched degenerated wavelengths, with two of these waves, which possess double wavelengths $\lambda_{RTI}$ and $\lambda_{BG1}$ [$\lambda_{RTI}$=2·$\lambda_{BG1}$] and which belong respectively to the fundamental mode guided by total internal reflection (RTI) and to the fundamental mode guided in the first photonic forbidden band (BG1).

In the embodiment of FIG. 22, the inclusions 2 and 3 are of differing sizes and form a square periodic network. More particularly, the core 4 is surrounded by a square central crown and constituted by inclusions 2 of a high refractive index n2, the inclusions 3 of a low refractive index n3 all being situated outside this central crown.

The inclusions 2 of a high refractive index n2 are for instance inclusions of silica doped with germanium and the inclusions 3 of a low refractive index n3 are for instance air holes.

Figure 23:
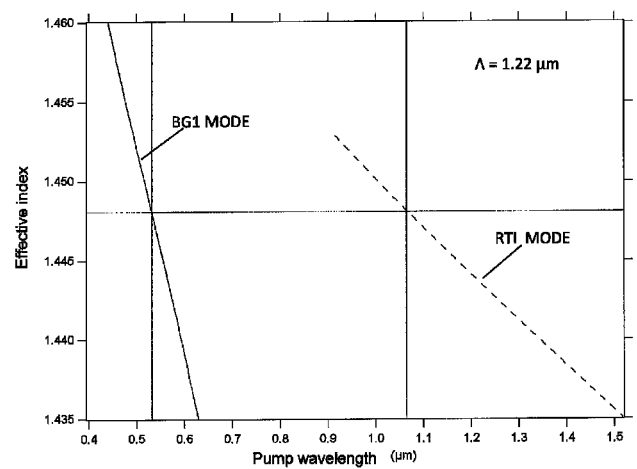
FIG. 23 is a diagram showing the effective index variation, in function of the wavelength (in μm), of the fundamental modes in the first photonic forbidden band (BG1) and in the total internal reflection band (RTI) of a microstructured optical fibre according to FIG. 22, and characterised by an inclusions network step Λ equalling 1.22 μm and by a ratio $d_3/\Lambda$ of the index $n_3$ inclusions equalling 0.32, the silica index varying according to the Sellmeier Law.
Figure 24:
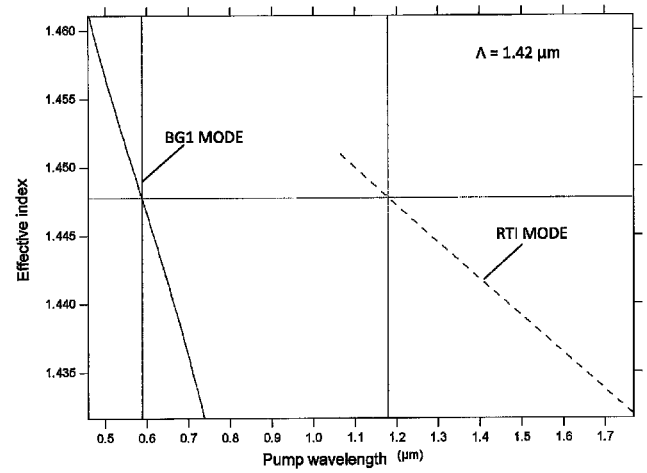
FIG. 24 is a diagram showing the effective index variation, in function of the wavelength (in μm), of the fundamental modes in the first photonic forbidden band (BG1) and in the total internal reflection band (RTI) of a microstructured optical fibre according to FIG. 22, and characterised by an inclusions network step Λ equalling 1.42 μm and by a ratio $d_3/\Lambda$ of the index $n_3$ inclusions equalling 0.32, the silica index varying according to the Sellmeier Law.
Figure 25:
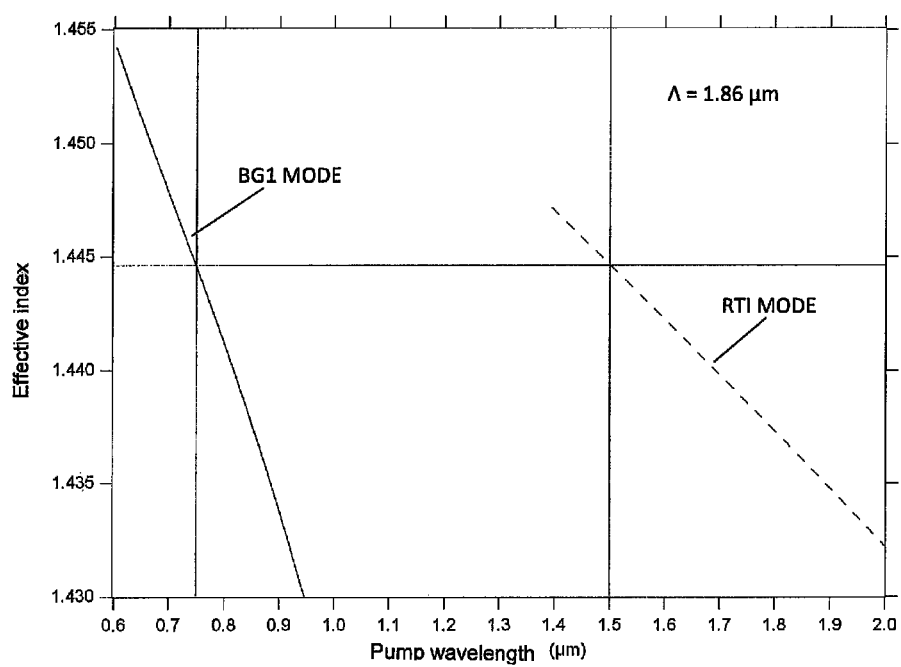
FIG. 25 is a diagram showing the effective index variation, in function of the wavelength (in μm), of the fundamental modes in the first photonic forbidden band (BG1) and in the total internal reflection band (RTI) of a microstructured optical fibre according to FIG. 22, and characterised by an inclusions network step Λ equalling 1.86 μm and by a ratio $d_3/\Lambda$ of the index $n_3$ inclusions equalling 0.32, the silica index varying according to the Sellmeier Law.
Figure 26:
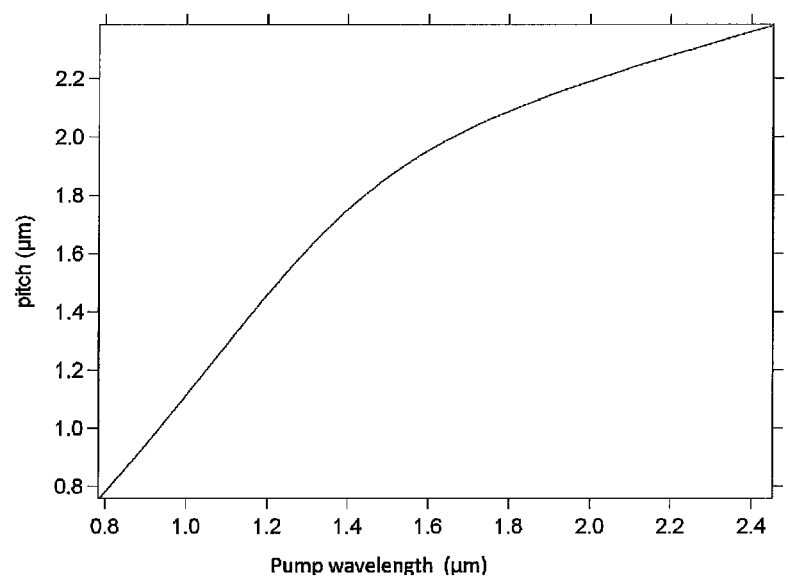
FIG. 26 is a curve representing the development (in μm) of the network step Λ of an optical fibre according to FIG. 22, in function of a pump length between 0.8 μm and 2.5 μm, for obtaining a doubling of frequency from this pump wavelength, the silica index varying according to the Sellmeier Law.

The curves of FIGS. 23 to 25 show the development of the effective refractive (n) index of the fundamental mode in the first photonic forbidden band (BG1) and guided by total internal reflection (RTI) for an optical fibre according to FIG. 22 (with inclusions 2 of silica doped with germanium and inclusions 3 formed by air holes).

These curves have been obtained in the same manner as the curves of FIGS. 8 to 12 and with the following parameters:
$d2/\Lambda=0.72$; $d3/\Lambda=0.32$
$\Lambda n=30\times 10^{-3}$
FIG. 23: $\Lambda=1.22$ μm
FIG. 24: $\Lambda=1.42$ μm
FIG. 25: $\Lambda=1.86$ μm The curves of FIGS. 22 to 26 show that for different steps $\Lambda$ of the network, it is possible to realise a combination of three phase-matched wavelengths, with two of these waves, which possess double wavelengths $\lambda_{RTI}$ and $\lambda_{BG1}$ [$\lambda_{RTI}=2\cdot\lambda_{BG1}$] and which belong respectively to the fundamental mode guided by total internal reflection (RTI) and to the fundamental mode guided in the first photonic forbidden band (BGI).

The invention is not limited to the particular embodiments described with reference to the annexed drawings. Other embodiments within the scope of the person skilled in the art and covered by the annexed claims can be considered, without however, departing from the context of the invention.

The invention claimed is:

1. A microstructured optical fibre including a core surrounded by a cladding, the cladding comprising a background material having a refractive index (n1) and several inclusions of at least two different types, a first type of inclusions having a refractive index (n2) that is higher than the refractive index (n1) of the background material, and a second type of inclusions having a refractive index (n3) that is lower than the refractive index (n1) of the background material, said fibre enabling guidance by means of photonic forbidden bands of a fundamental mode of the light, characterized in that the inclusions of the cladding are arranged and dimensioned in such a way as to enable guidance by total internal reflection (RTI) of a fundamental mode of the light, centred on a wavelength $\lambda_{RTI}$, and to enable guidance of a fundamental mode of the light in a first photonic forbidden band (BG1), centred on a wavelength $\lambda_{BG1}$ that is lower than this wavelength $\lambda_{RTI}$ of the fundamental mode guided by total internal reflection (RTI), and wherein the wavelength $\lambda_{RTI}$ of the fundamental mode guided by total internal refection (RTI) is situated outside of the wavelength range of the fundamental mode guided in the first forbidden band (BG1).

2. The microstructured optical fibre according to claim 1, wherein the average effective index of the cladding is lower than the refractive index (n1) of the background material of the cladding at least for a wavelength range higher than the wavelength $\lambda_{BG1}$.

3. The microstructured optical fibre according to claim 1, wherein the core is surrounded by a central crown constituted by the first type of inclusions, all the inclusions of the second type being situated outside of this central crown.

4. The microstructured optical fibre according to claim 1, wherein the refractive index (n2) of the inclusions is higher than the refractive index (n4) of the core.

5. The microstructured optical fibre according to claim 1, wherein the core of the fibre comprises the same background material as the cladding.

6. The microstructured optical fibre according to claim 1, wherein the refractive index (n4) of the cladding is equal to the refractive index (n1) of the background material of the cladding.

7. The microstructured optical fibre according to claim 6, wherein the core of the fibre is constituted of the same material as the background material of the cladding.

8. The microstructured optical fibre according to claim 1, wherein the inclusions are arranged in the form of a periodic network characterized by a constant step.

9. The microstructured optical fibre according to claim 8, wherein the dimension of the second type of inclusions and the step of the network of inclusions are chosen in such a way that the average effective index of the cladding is lower than the refractive index (n1) of the background material of the cladding at least for a wavelength range that is higher than the wavelength $\lambda_{BG1}$.

10. The microstructured optical fibre according to claim 1, wherein the inclusions of the cladding are arranged and dimensioned in such a way as to allow a combination of m waves (m≥3) that are phase-matched, with at least two of these waves possessing different wavelengths ($\lambda_{RTI}$, $\lambda_{BG1}$), belonging respectively to the fundamental mode guided by total internal reflection (RTI) and to the fundamental mode guided in the first photonic forbidden band (BG1).

11. The microstructured optical fibre according to claim 1, wherein the fundamental mode guided in the first forbidden band (BG1) and the fundamental mode guided by total internal reflection (RTI) cumulatively respect the following conditions (a) and (b):

$$\sum_{i=1}^{m} \frac{1}{\lambda_i} = 0 \quad (a)$$

$$\sum_{i=1}^{m} \frac{n_{\lambda_i}}{\lambda_i} = 0 \quad (b)$$

m being a whole number above or equal to 3, and $n_{\lambda_i}$ being the value of the effective index of the fundamental mode propagated in the optical fibre at wavelength $\lambda_i$, and in that of the wavelengths $\lambda_i$ that respect the conditions (a) and (b), at least one wavelength ($\lambda_{RTI}$) belongs to the fundamental mode guided by total internal reflection (RTI), and at least one wavelength ($\lambda_{BG1}$) belongs to the fundamental mode guided in the first forbidden band (BG1).

12. The microstructured optical fibre according to claim 1, wherein the inclusions of the cladding are arranged and dimensioned in such a way that for at least two different wavelengths $\lambda_{RTI}$ and $\lambda_{BG1}$ belonging respectively to the fundamental mode guided by total internal reflection (RTI) and to the fundamental mode guided in the first photonic forbidden band (BG1), the effective refractive indices of the fibre at these two wavelengths $\lambda_{RTI}$ and $\lambda_{BG1}$ are equal and lower than the refractive index (n1) of the background material of the cladding.

13. The microstructured optical fibre according to claim 1, wherein the two wavelengths $\lambda_{RTI}$ and $\lambda_{BG1}$ respect the following condition: $\lambda_{RTI}=k\cdot\lambda_{BG1}$, k being a whole number above or equal to 2.

14. The microstructured optical fibre according to claim 13, wherein the two wavelengths $\lambda_{RTI}$ and $\lambda_{BG1}$ respect the following condition: $\lambda_{RTI}=2\lambda_{BG1}$.

15. The microstructural optical fibre according to claim 13, wherein the two wavelengths $\lambda_{RTI}$ and $\lambda_{BG1}$ respect the following condition: $\lambda_{RTI}=3\lambda_{BG1}$.

16. The microstructured optical fibre according to claim 1, wherein the network of inclusions is hexagonal and of the honeycomb type.

17. The microstructured optical fibre according to claim 1, wherein the network of inclusions forms a square.

18. The microstructured optical fibre according to claim 1, wherein the network of inclusions includes at least two concentric crowns formed by inclusions of the first type, each inclusion of the first type being surrounded by several inclusions of the second type, with the exception of inclusions of the first type of the central crown.

19. The microstructured optical fibre according to claim 1, wherein the background material of the cladding is made of silica and the inclusions of the second type include air holes.

20. The microstructured optical fibre according to claim 1, wherein the background material of the cladding is made of silica and the inclusions of the first type include inclusions of doped silica.

21. The microstructured optical fibre according to claim 20, wherein the inclusions of the first type include inclusions made of silica doped with germanium or of silica doped with phosphorus.

22. The microstructured optical fibre according to claim 1, wherein the background material of the cladding is made of silica and the inclusions of the first type include inclusions made of tellurite glass or of chalcogenide glass.

23. The microstructured optical fibre according to claim 1, wherein the inclusions of the first type include inclusions containing a liquid or gas presenting a refractive index (n2) higher than the refractive index (n1) of the background material of the cladding.

24. The microstructured optical fibre according to claim 1, wherein the inclusions of the second type include inclusions containing a liquid or gas presenting a refractive index (n3) lower than the refractive index (n1) of the background material of the cladding.

25. Use of a microstructured optical fibre as described in claim 1 for the generation of frequencies by non-linear effects, in particular for one of the following applications: the generation of twin photons, the generation of triplet photons, and the generation of multiple frequencies, in particular the doubling of frequency and the tripling of frequency.

26. A microstructured optical fibre including a core surrounded by a cladding, the cladding comprising a background material having a refractive index (n1) and several inclusions of at least two different types, a first type of inclusions having a refractive index (n2) that is higher than the refractive index (n1) of the background material, and a second type of inclusions having a refractive index (n3) that is lower than the refractive index (n1) of the background material, said fibre enabling guidance by means of photonic forbidden bands of a fundamental mode of the light, characterised in that the inclusions of the cladding are arranged and dimensioned in such a way as to enable guidance by total internal reflection (RTI) of a fundamental mode of the light, centred on a wavelength $\lambda_{RTI}$, and to enable guidance of a fundamental mode of the light in a first photonic forbidden band (BG1), centered on a wavelength $\lambda_{BG1}$ that is lower than this wavelength $\lambda_{RTI}$ of the fundamental mode guided by total internal reflection (RTI), wherein the fundamental mode guided in the first forbidden band (BG1) and the fundamental mode guided by total internal reflection (RTI) cumulatively respect the following conditions (a) and (b):

$$\sum_{i=1}^{m} \frac{1}{\lambda_i} = 0 \qquad (a)$$

$$\sum_{i=1}^{m} \frac{n_{\lambda_i}}{\lambda_i} = 0 \qquad (b)$$

m being a whole number above or equal to 3, and $n_{\lambda_i}$, being the value of the effective index of the fundamental mode propagated in the optical fibre at wavelength $\lambda_i$, and in that of the wavelengths $\lambda_i$ that respect the conditions (a) and (b), at least one wavelength ($\lambda_{RTI}$) belongs to the fundamental mode guided by total internal reflection (RTI), and at least one wavelength ($\lambda_{BG1}$) belongs to the fundamental mode guided in the first forbidden band (BG1).

27. Use of a microstructured optical fibre as described in claim 26 for the generation of frequencies by non-linear effects, in particular for one of the following applications: the generation of twin photons, the generation of triplet photons, and the generation of multiple frequencies, in particular the doubling of frequency and the tripling of frequency.

28. A microstructured optical fibre including a core surrounded by a cladding, the cladding comprising a background material having a refractive index (n1) and several inclusions of at least two different types, a first type of inclusions having a refractive index (n2) that is higher than the refractive index (n1) of the background material, and a second type of inclusions having a refractive index (n3) that is lower than the refractive index (n1) of the background material, said fibre enabling guidance by means of photonic forbidden bands of a fundamental mode of the light, characterised in that the inclusions of the cladding are arranged and dimensioned in such a way as to enable guidance by total internal reflection (RTI) of a fundamental mode of the light, centred on a wavelength $\lambda_{RTI}$, and to enable guidance of a fundamental mode of the light in a first photonic forbidden band (BG1), centred on a wavelength $\lambda_{BG1}$ that is lower than this wavelength $\lambda_{RTI}$, of the fundamental mode guided by total internal reflection (RTI), wherein the two wavelengths $\lambda_{RTI}$ and $\lambda_{BG1}$ respect the following condition: $\lambda_{RTI}=k\cdot\lambda_{BG1}$, k being a whole number above or equal to 2.

29. Use of a microstructured optical fibre as described in claim 28 for the generation of frequencies by non-linear effects, in particular for one of the following applications: the generation of twin photons, the generation of triplet photons, and the generation of multiple frequencies, in particular the doubling of frequency and the tripling of frequency.

* * * * *

UNITED STATES PATENT AND TRADEMARK OFFICE
CERTIFICATE OF CORRECTION

PATENT NO. : 8,442,372 B2
APPLICATION NO. : 12/670500
DATED : May 14, 2013
INVENTOR(S) : Yves Quiquempois et al.

Page 1 of 2

It is certified that error appears in the above-identified patent and that said Letters Patent is hereby corrected as shown below:

In the Specifications:

Column 1, line 14, delete "Al" and insert --A1--.

Column 6, line 20, delete "n2that" and insert --n2 that--.

Column 6, line 35, delete "n4corresponds" and insert --n4 corresponds--.

Column 7, line 33, delete "n 3" and insert --n3--.

Column 9, line 9, delete "n1follows" and insert --n1 follows--.

Column 9, line 37, delete " $\lambda/\Lambda)$ ." and insert -- $(\lambda/\Lambda).$ --.

Column 9, line 51, delete "n3on" and insert --n3 on--.

Column 11, line 7, delete "μM" and insert --μm--.

Column 12, line 14, delete "$w_1+w_2\ w_3$" and insert --$w_1 + w_2 \rightarrow w_3$--.

Column 13, line 34, delete "(BGI)" and insert --BG1)--.

In the Claims:

Column 13, Claim 1, line 60, delete "refection" and insert --reflection--.

Signed and Sealed this
Third Day of September, 2013

Teresa Stanek Rea
*Acting Director of the United States Patent and Trademark Office*

CERTIFICATE OF CORRECTION (continued)
U.S. Pat. No. 8,442,372 B2

Column 15, Claim 15, line 11, delete "microstructural" and insert --microstructured--.

Column 16, Claim 26, line 7, delete "centered" and insert --centred--.